US012658639B2

(12) United States Patent
Oliver

(10) Patent No.: US 12,658,639 B2
(45) Date of Patent: Jun. 16, 2026

(54) CONNECTOR ARM LOCK FOR PLUG-IN TYPE ELECTRICAL WIRING MANAGEMENT DEVICES

(71) Applicant: EATON INTELLIGENT POWER LIMITED, Dublin (IE)

(72) Inventor: Jason Roy Oliver, Peachtree City, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 280 days.

(21) Appl. No.: 18/374,970

(22) Filed: Sep. 29, 2023

(65) Prior Publication Data

US 2025/0112404 A1 Apr. 3, 2025

(51) Int. Cl.
*H01R 13/627* (2006.01)

(52) U.S. Cl.
CPC ................................ *H01R 13/6273* (2013.01)

(58) Field of Classification Search
CPC ................................................ H01R 13/6273
USPC ........................................................ 439/357
See application file for complete search history.

(56) References Cited

U.S. PATENT DOCUMENTS

| | | | | |
|---|---|---|---|---|
| 7,112,102 | B2 * | 9/2006 | Masaki | H01R 13/567 439/682 |
| 9,590,371 | B2 * | 3/2017 | Yan | H05K 7/1457 |
| 10,756,487 | B2 * | 8/2020 | Lappoehn | H01R 13/641 |
| 2021/0006012 | A1 * | 1/2021 | Kajiura | H01R 13/193 |

* cited by examiner

*Primary Examiner* — Gary F Paumen
(74) *Attorney, Agent, or Firm* — Eckert Seamans Cherin & Mellott, LLC

(57) ABSTRACT

An improved wire management arrangement for managing utility-connected conductors run to an electrical wiring device includes a connector and a housing. The connector receives the conductors and includes electrical contacts that connect to the conductors. The rear side of the housing is structured to be coupled to the connector, and the front side of the housing is structured to have an electrical wiring device faceplate installed so that the faceplate can connect to utility power through the connector. The connector includes latching elements, and the housing includes latch receiving openings that cooperate with the latching elements in order to couple the connector to the housing. The latch receiving openings obstruct the latching elements from unintentionally becoming de-installed during the Underwriters Lab (UL) 20 pull test.

20 Claims, 11 Drawing Sheets

CONNECTOR ARM LOCK FOR PLUG-IN TYPE ELECTRICAL WIRING MANAGEMENT DEVICES

FIELD OF THE INVENTION

The disclosed concept relates generally to electrical wiring devices, and in particular, to devices for ensuring that electrical conductors run to electrical wiring devices can withstand pulling forces as mandated by applicable safety standards.

BACKGROUND OF THE INVENTION

At utility customer sites such as residential, commercial, and industrial buildings, electrical wiring devices are installed to enable users to safely access electrical wiring in order to control power to devices such as light fixtures or to provide a plug point for plug-in electrical devices. A utility customer site receives utility power from the electrical grid via a distribution line that is electrically connected to a main service panel at the customer site. The main service panel at the customer site includes a number of main circuit breakers, and conductors installed throughout the utility customer site are used to electrically connect electrical wiring devices to the main circuit breaker(s) either directly or via branch circuit breakers.

During the rough-in phase of constructing a new building, the main circuit breaker(s) and branch circuit breakers are installed, and it is usually preferable to run conductors from the circuit breakers to all of the individual sites in the building where electrical wiring devices are desired prior to installing drywall. Once the drywall is installed, a wall box can be installed at each site to which conductors have been run, and the conductors at a given site can be inserted into the interior of the wall box, thus enabling the conductors to be accessed through the wall box when it is time to install an electrical device such as a snap switch or electrical receptacle in the wall box.

When it is desired to have wire management within a wall box, the conductors can be inserted into a wire management arrangement that can then be inserted into the wall box, rather than inserting the conductors directly into the wall box. Wire management arrangements typically include a connector and a housing, with the connector being coupled to the housing using a latch-type fastening mechanism. The connectors and housings of wire management arrangements are designed such that, when a connector is coupled to a housing within a wall box that is properly installed in a building, the latch of the wire management connecter must be released in order to remove the wire management connector from the housing.

Underwriters Lab (UL) sets the standards for electrical wiring that are required to be followed in many parts of the United States and Canada. Under UL 20 and UL 498 standards, during a pull test, a wire management connector connected to a wire management housing must be able to withstand 20 pounds of force (lbf) exerted in a direction tending to remove the connector for a period of one minute without becoming detached from the wire management housing. That is, the latch mechanism of the wire management connector must be able to resist unintended unlatching from the wire management housing during the pull test in order to prevent unintended disconnection of the electrical conductors within the wall box.

Thus, the latching mechanism of a wire management connector must be capable of keeping the connector latched to the wire management housing without becoming unintentionally de-latched under 20 lbf, while also being relatively easy to manually unlatch from the wire management housing in those instances when unlatching is intended (e.g. for maintenance or repair purposes). Balancing these two considerations can be challenging, as the latching mechanism of a wire management connector that can easily withstand 20 lbf during a pull test may be difficult to unlatch when unlatching is intended, while the latching mechanism of a wire management connector that can easily be unlatched when unlatching is intended may not be able to resist unintentional unlatching under 20 lbf during a pull test.

There is thus room for improvement in wire management arrangements intended for use with electrical wiring device installations and latching mechanisms therefor.

SUMMARY OF THE INVENTION

These needs, and others, are met by an improved wire management arrangement that comprises a connector and a housing. The connector is configured to receive utility-connected conductors and includes electrical contacts that connect to the conductors. The rear side of the housing is structured to be coupled to the connector, and the front side of the housing is structured to have an electrical wiring device faceplate installed so that the faceplate can connect to utility power through the connector. The connector includes two lock arms, with each lock arm including a latching element, and the housing includes two latch receiving openings, with each latch receiving opening corresponding to and cooperating with one of the latching elements in order to couple the connector to the housing. The lock arms and the latch receiving openings are structured such that the latching elements of the lock arms need to move laterally into the latch receiving openings in order to be installed within the latch receiving openings. The lock arms and the latch receiving openings are further structured such that, once the latching elements of the lock arms are installed within the latch receiving openings, the lock arms cannot move medially out of the latch receiving openings without external medial force being applied to the latching elements. In addition, the latch receiving openings are structured such that the connector moves into a locked position when downward force is applied to the connector absent any external medial force, thus successfully preventing the unintentional de-installation of the connector from the housing during the Underwriters Lab (UL) 20 pound pull test.

In accordance with one aspect of the disclosed concept, a wire management arrangement for managing a plurality of conductors connected between an electrical wiring device and an electrical grid comprises: a connector and a housing. The connector comprises: a central body structured to receive a plurality of conductors; a plurality of prong receiving slots, the prong receiving slots being configured to electrically connect to the conductors; and two lock arms. Each lock arm includes: a medial side that faces the central body, a lateral side disposed opposite the medial side, and a latching element, with the latching element having a bottom surface that extends laterally from the lateral side. The housing includes two latch receiving openings and a plurality of conductive prongs, with each conductive prong being structured to be received by one of the prong receiving slots of the wire management connector. Each latch receiving opening corresponds to one of the latching elements and includes: a medial end and a lateral end such that the latch receiving opening extends from the medial end to the lateral end, and a bottom surface structured to engage the bottom surface of the latching element. Each latching element is structured to extend through its corresponding latch receiving opening from the medial end to the lateral end in order to couple the connector to the housing. Each latch receiving opening is structured to exert lateral resistance against the corresponding latching element in response to exertion of a downward force on the connector.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
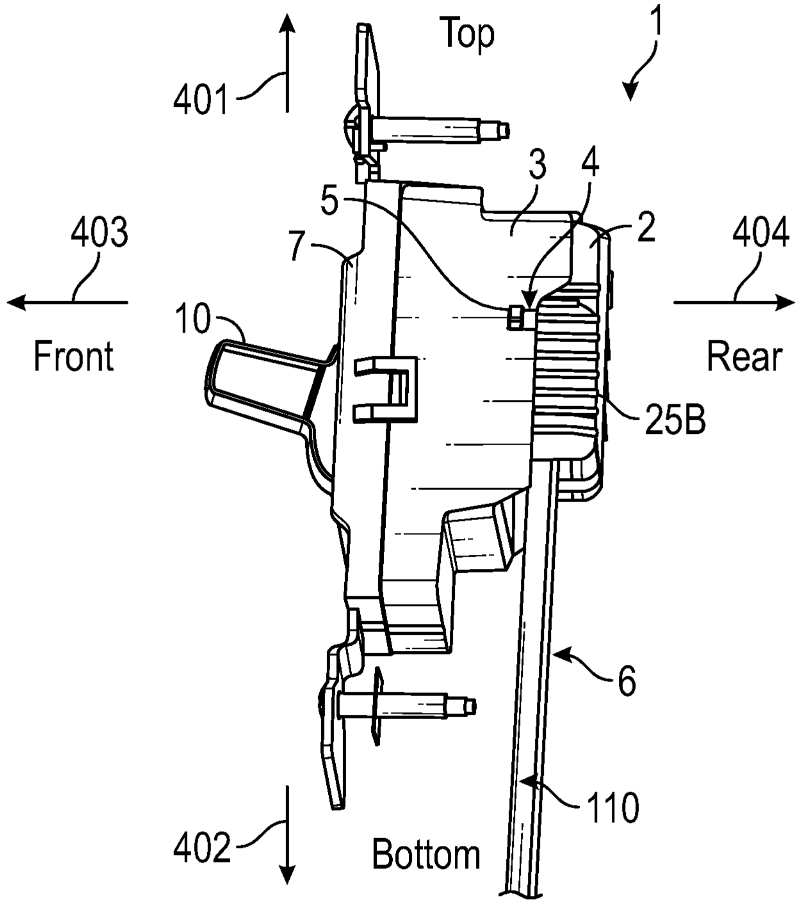
FIG. 1 is a partial isometric side view of an electrical wiring device faceplate coupled to an electrical wiring device wire management arrangement that comprises a first embodiment of a wire management connector coupled to a first embodiment of a wire management housing, with the first embodiment of the wire management connector and the first embodiment of the wire management housing comprising features included in improved second and third embodiments shown in FIGS. 5-11.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, the term "electrical wiring device" refers to a point of connection that enables an electrical device to connect to the electrical grid.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

FIG. 1 is a partial isometric side view of an electrical wiring device wire management arrangement 1 that comprises a first embodiment of a wire management connector 2 and a first embodiment of a wire management housing 3 coupled to one another. For brevity, the electrical wiring device wire management arrangement 1 is referred to hereinafter as the "wire management arrangement 1", the wire management connector 2 is referred to hereinafter as the "connector 2", and the wire management housing 3 is referred to hereinafter as the "housing 3". FIGS. 5-11 show additional embodiments of components of wire management connectors and wire management housings that embody improvements to the connector 2 and housing 3 shown in FIG. 1. While some features of the wire management arrangement 1 are also included in the improved wire management arrangements shown in FIGS. 5-11, other features of the wire management arrangement 1 were improved upon to produce the improved wire management arrangements shown in FIGS. 5-11, as will become apparent from the discussion of FIGS. 5-11. A discussion of the wire management arrangement 1 is provided in order to make the advantageous features that are detailed in conjunction with FIGS. 5-11 more readily apparent.

As a preliminary matter, it is noted that there are four directions/orientations indicated in FIG. 1: "top", "bottom", "front", and "rear". The four directions/orientations indicated in FIG. 1 are used hereinafter to describe the various sides of the individual components of the wire management arrangement 1, in accordance with how the directions/orientations are labeled in FIG. 1. In addition, movement or orientation toward the "top" direction as indicated by the arrow 401 in FIG. 1 can be described as "upward", movement or orientation toward the "bottom" direction as indicated by the arrow 402 in FIG. 1 can be described as "downward", movement or orientation toward the "front" direction as indicated by the arrow 403 in FIG. 1 can be described as "frontward", and movement or orientation toward the "rear" direction as indicated by the arrow 404 in FIG. 1 can be described as "rearward". When feasible, in subsequent figures, the arrows 401, 402, 403, and 404 are used to denote the orientation of the structures shown relative to the orientation of the electrical wiring device wire management arrangement 1 as shown in FIG. 1. For clarity and as context necessitates, each of the reference numbers 401, 402, 403, 404 is sometimes used herein by inserting the reference number after an associated directional term. In one non-limiting example, movement of a component in the upward direction 401 may be described as "movement upward 401" (as opposed to using the phrase "movement in the upward direction 401"). In another non-limiting example, a force exerted in the downward direction 402 may be described as a "downward 402 force" (as opposed to using the phrase "a force exerted in the downward direction 402).

Still referring to FIG. 1, the housing 3 includes two tab receiving openings 4 (only one of which is visible in FIG. 1), and the connector 2 includes two latching tabs 5 (only one of which is visible in FIG. 1), with each tab receiving opening 4 being structured to receive a corresponding one of the latching tabs 5 in order to couple the connector 2 to the housing 3, as detailed further later herein. A plurality of conductors 6 connected to utility service are inserted into the connector 2. The wire management arrangement 1 is structured to enable an electrical wiring device faceplate (for example and without limitation, a snap switch faceplate or electrical receptacle faceplate) to be coupled to the wire management arrangement 1 so that the electrical wiring device can electrically connect to utility service through the conductors 6. It is noted that the wire management arrangement 1 would typically be housed within a wall box (not shown in the figures), and that the electrical wiring device faceplate would be fastened to the wire management arrangement 1 within the wall box.

In FIG. 1, an electrical wiring device faceplate 7 is shown coupled to the wire management arrangement 1 via the front side of the housing 3. The front side of the housing 3 includes a plurality of electrical contacts (not visible or numbered in the figures) to which the electrical wiring device faceplate 7 can be electrically connected, and which are electrically connected to a corresponding plurality of conductive prongs 8 extending from a rear platform wall 9 of the housing 3 (shown in FIG. 2A). As detailed further later herein, the electrical wiring device 7 can electrically connect to the conductors 6 through the wire management arrangement 1. The electrical wiring device faceplate 7 shown in FIG. 1 is a snap switch faceplate that includes a toggle 10. It is noted that a snap switch is just one of several available types of electrical wiring devices, and that the snap switch faceplate shown in FIG. 1 is used as a non-limiting illustrative example of an electrical wiring device faceplate 7 that can be coupled to the wire management arrangement 1 in order to connect to utility service through the conductors 6. For example and without limitation, instead of a snap switch, the faceplate 7 could alternatively include switch structures other than snap switches, receptacle-type openings, USB charging connector ports, a ground fault circuit interrupter (GFCI) device, or a wireless charging transmitter. Because the electrical wiring device faceplate 7 shown in FIG. 1 is a snap switch faceplate, the electrical wiring device faceplate 7 is referred to hereinafter as the "snap switch 7" (the term "faceplate" being omitted hereinafter for brevity), but it is to be understood that the wire management arrangement 1 is also suitable for use with faceplates of electrical devices other than snap switches that need to connect to utility power through the conductors 6.

Figure 2A:
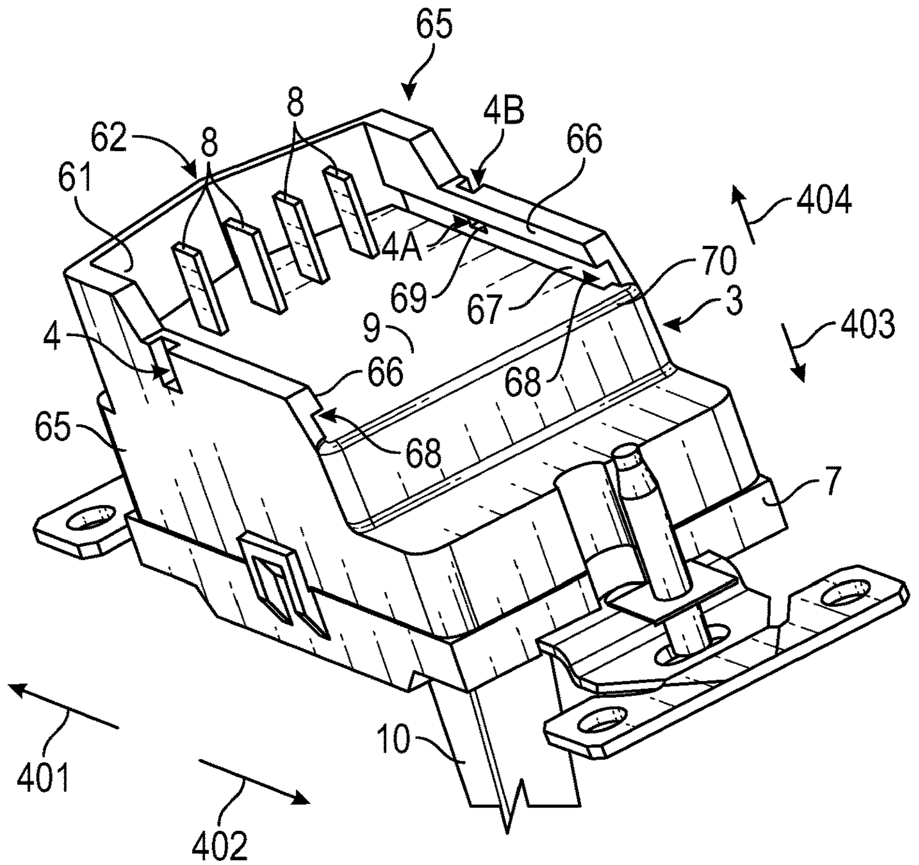
FIG. 2A is a rotated partial isometric view of the electrical wiring device wire management arrangement shown in FIG. 1, with the wire management connector removed.
Figure 3:
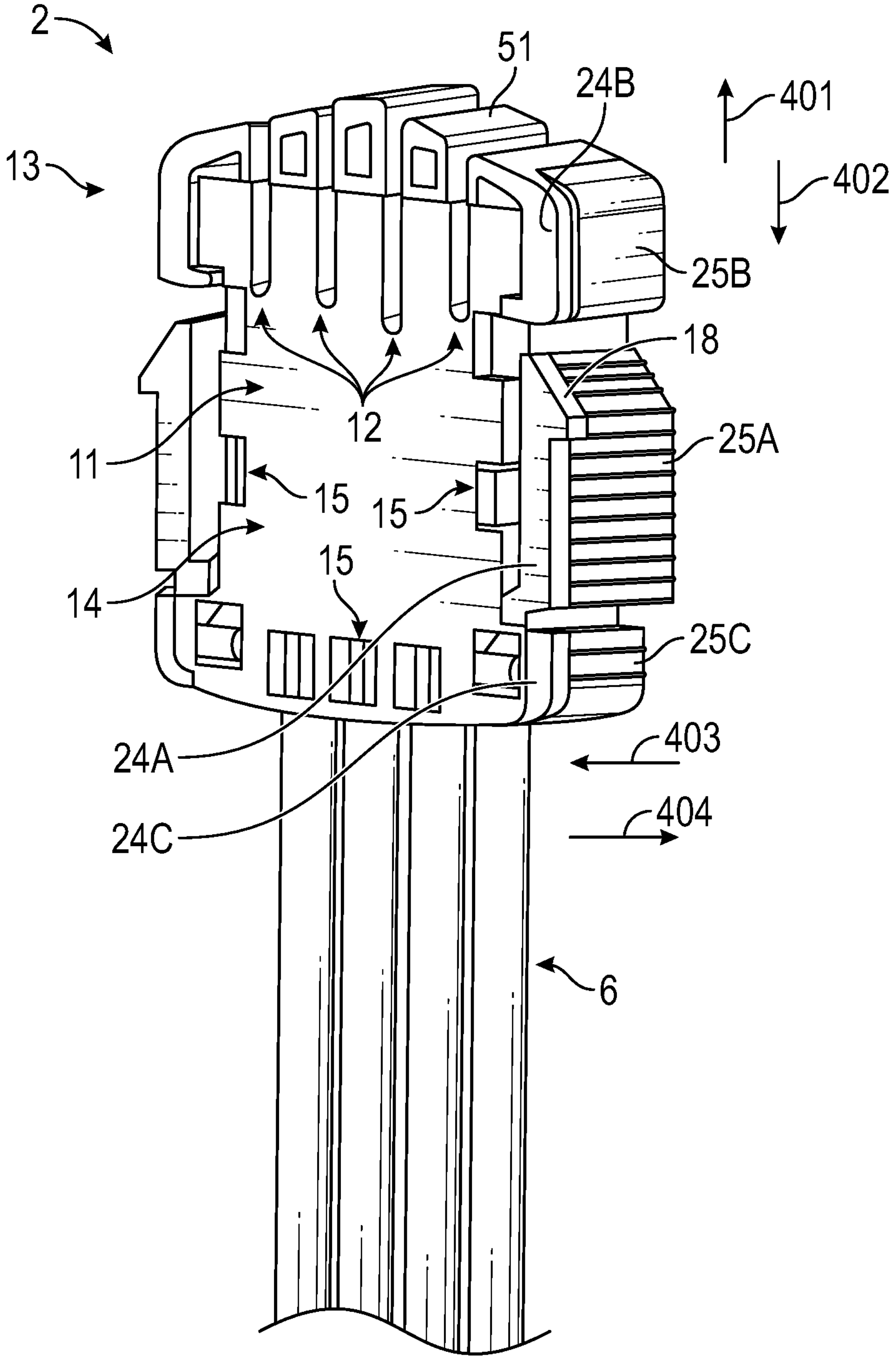
FIG. 3 is a partial isometric view of the front side of the wire management connector shown in FIG. 1.

Reference is now made to FIG. 2A and FIG. 3. In FIG. 2A, the housing 3 and snap switch 7 are shown coupled to one another and rotated (relative to the orientation shown in FIG. 1) with the connector 2 removed so that the rear side of the housing 3 is visible, and in FIG. 3, the connector 2 is shown detached from the housing 3 so that the front side of the connector 2 is visible. As previously mentioned and as shown in FIG. 2A, the rear side of the housing 3 includes a plurality of conductive prongs 8. As shown in FIG. 3, the front side 11 of the connector 2 includes a plurality of prong receiving slots 12 structured to receive the prongs 8 that are shown in FIG. 2A. The connector 2 is structured such that each prong receiving slot 12 includes an electrical contact (not visible in the figures) that enables each conductor 6 inserted into the connector 2 to electrically connect to the electrical contact of a corresponding one of the prong receiving slots 12. Accordingly, inserting the housing prongs 8 (FIG. 2A) into the prong receiving slots 12 (FIG. 3) puts each prong 8 into electrical contact with one of the conductors 6, and electrically connects the snap switch 7 to the conductors 6 after the snap switch 7 is installed in the housing 3. In the frontward 403 to rearward 404 dimension, the prong receiving slots 12 extend from the front side 11 of the connector to an interior portion of the connector 2, i.e. such that the prong receiving slots 12 do not extend all the way to the rear side of the connector 2 (as is evident from the view of the rear side of the connector 2 shown in FIG. 4).

Figure 4:
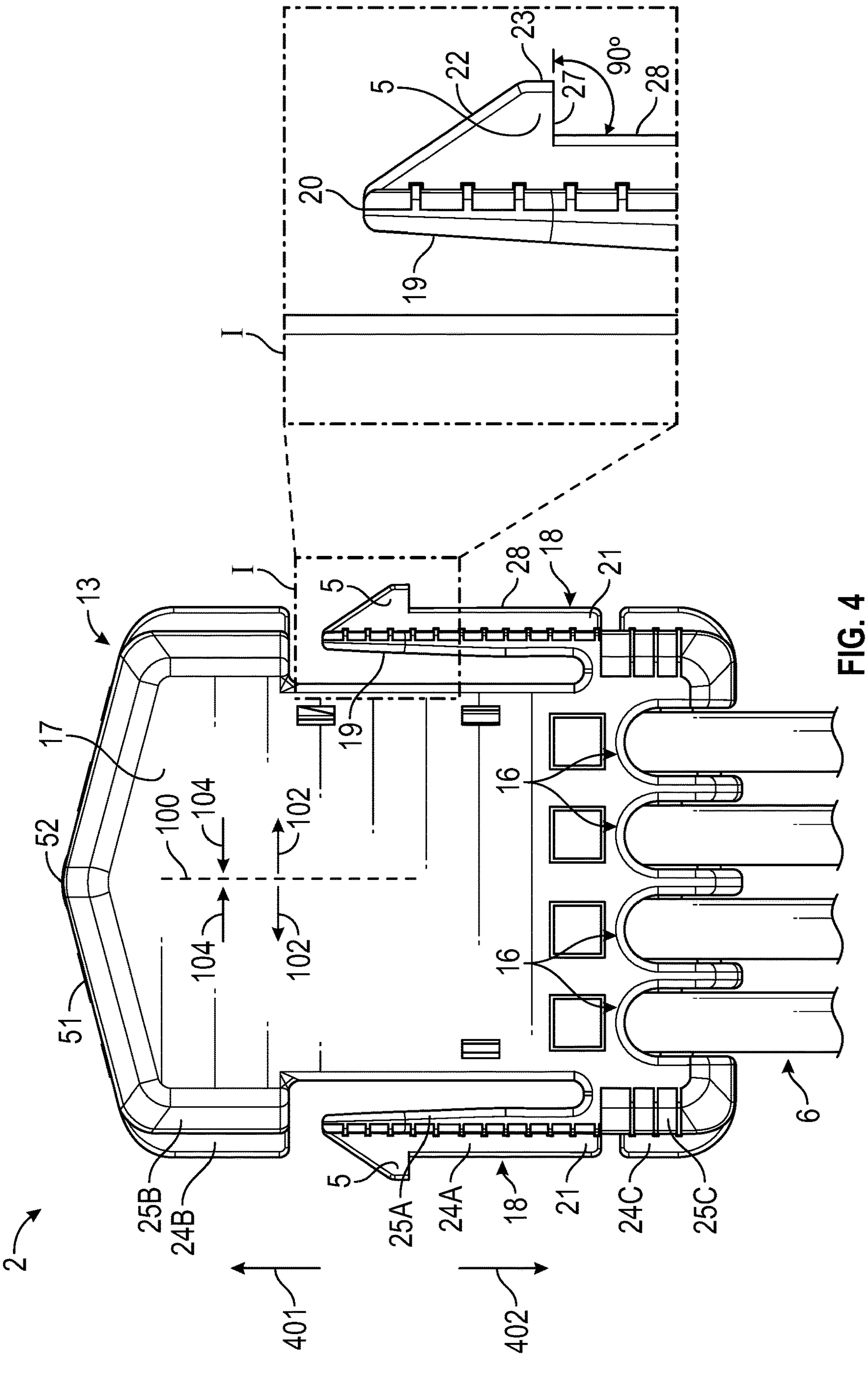
FIG. 4 is a rear elevation view of the wire management connector shown in FIG. 3.

Reference is now made to FIG. 4 in conjunction with FIG. 3. FIG. 3 shows that the connector 2 comprises a main compartment 13 and a removable front cover 14, and FIG. 4 shows the rear side of the main compartment 13. The main compartment 13 and front cover 14 are structured to enable the front cover 14 to be removably coupled to the main compartment 13 via a number of fastening mechanisms 15 (numbered in FIG. 3). The rear side of the main compartment 13 includes a plurality of conductor openings 16 (shown in FIG. 4), and the front cover 14 can be removed from the main compartment 13 so that each of the conductors 6 can be inserted into the interior of the main compartment 13 through one of the conductor openings 16 and then fixed in place within the interior of the main compartment 13. The front cover 14 is to be coupled to the main compartment 13 afterward in order to secure the conductors 6 in place within the interior of the connector 2.

Still referring to FIG. 4, a central axis 100 of the connector 2 is numbered. Movement or orientation coincidental with or parallel to the central axis 100 is described hereinafter as "axial". It is noted that both upward movement/orientation (as denoted by the arrow 401 in FIG. 4) and downward movement/orientation (as denoted by the arrow 402 in FIG. 4) are axial. Movement or orientation away from the central axis 100 and in the direction indicated by the arrows 102 (shown in FIG. 4) is described hereinafter as "lateral". Conversely, movement or orientation toward the central axis 100 and in the direction indicated by the arrows 104 (shown in FIG. 4) is described hereinafter as "medial". It is noted that the lateral and medial directions/orientations 102 and 104 are orthogonal to the frontward and rearward directions/orientations denoted by the arrows 403 and 404 in FIG. 1. It will be appreciated that each component in the fully assembled wire management arrangement 1 shown in FIG. 1 has a central axis parallel to and aligning with the central axis 100 shown in FIG. 4. Thus, the wire management arrangement 1 as a whole and the other individual components thereof (e.g. the housing 3) may also be described in terms of the central axis 100 and using the terms "lateral" and "medial".

As shown in FIG. 4, the main compartment 13 comprises a central body 17 with two lock arms 18 extending therefrom. Each lock arm 18 comprises an apex 20 at its top end (numbered in the enlargement inset I in FIG. 4) and a base 21 at its bottom end that is connected to the central body 17, with the remainder of the lock arm 18 extending upward 401 from the base 21, such that the lock arm 18 is disposed laterally relative to the central body 17 and is separated from the central body 17 by a gap (specifically, the gap is between the central body 17 and a medial side 19 of the lock arm 18 that faces the central body 17). As shown in the enlargement inset I in FIG. 4, for each lock arm 18, a sloped surface 22 extends both downward and laterally from the apex 20 to meet a lateral edge 23 of the latching tab 5. The positions of the lock arms 18 shown in FIG. 4 is the default state of the lock arms 18 when no external force acts upon the lock arms 18. Each lock arm 18 is structured to have memory so that, if the lock arms 18 are squeezed medially such that a top portion of each lock arm 18 is pushed closer toward the central body 17, the removal of such medial squeezing force causes the lock arms 18 to revert back to their default position shown in FIG. 4.

Figure 2B:
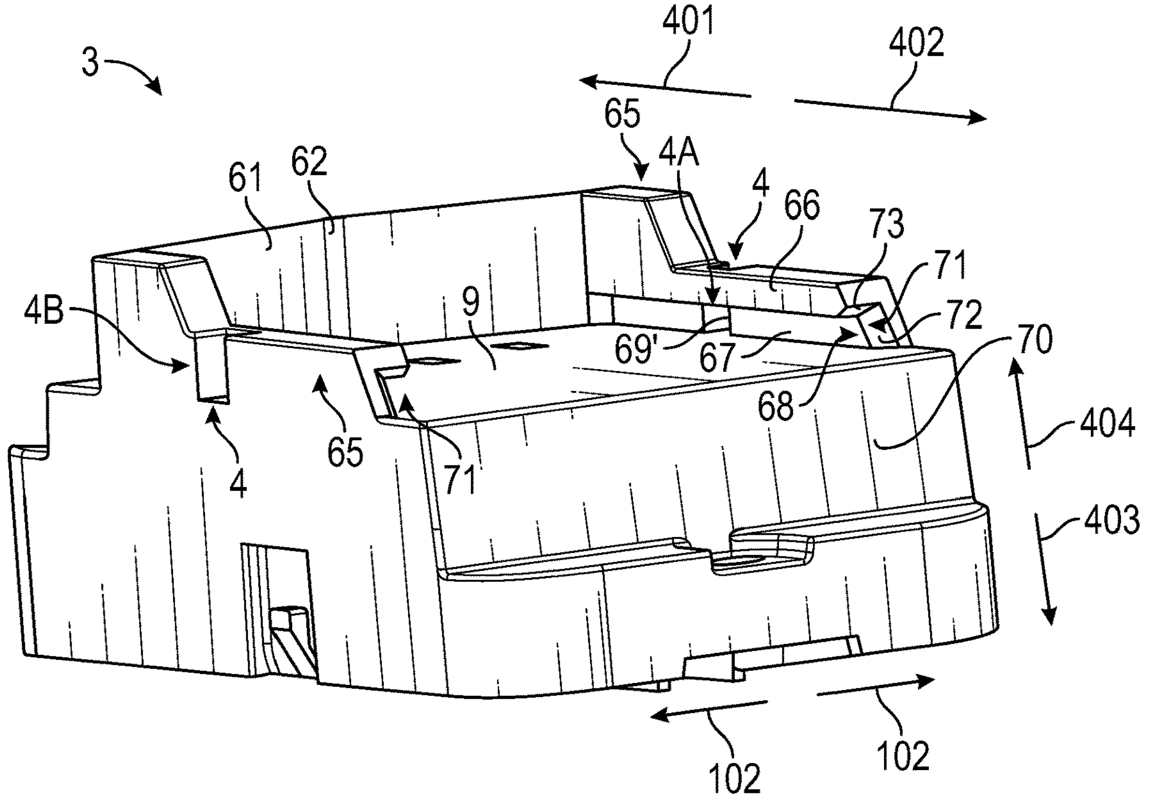
FIG. 2B is a rotated partial isometric view of the wire management housing shown in FIG. 2A, with the electrical wiring device faceplate removed.

Reference is now made to FIGS. 2A-2B and FIG. 3 in conjunction with FIG. 4 in order to describe the features of the connector 2 and housing 3 that enables the connector 2 to be installed in the housing 3. As shown in FIG. 4, a top side 51 of the connector 2 is structured as a chevron, such that the top side 51 comprises a peak 52 that forms the topmost portion of the connector 2. As best shown in FIG. 2A, the rear side of the housing 3 has a corresponding top wall 61 that is also structured as a chevron, such that the top wall 61 also comprises a peak 62 that forms the top most region of the housing 3. The rear side of the housing 3 also has two sidewalls 65, with one sidewall 65 extending downward from one lateral end of the top wall 61 and the other sidewall 65 extending downward from the other lateral end of the top wall 61 such that the two sidewalls 65 face one another. Each of the top wall 61 and the sidewalls 65 extend rearward 404 from the rear platform wall 9. Each sidewall 65 comprises a lip 66 and a recessed channel wall 67. The recessed channel wall 67 is the lateral-most portion of each sidewall 65 and the lip 66 extends medially from the recessed channel wall 67, thus creating a channel 68 on each lateral side of the housing 3, each channel 68 being bordered by the corresponding lip 66, recessed channel wall 67, and rear platform wall 9.

Referring to FIG. 4, each of the lock arms 18 comprises a flat portion 24A and a raised portion 25A. For each lock arm 18, the flat portion 24A forms the lateral side of the lock arm 18, and the raised portion 25A forms the medial side of the lock arm 18. In addition, a top portion of the central body 17 also comprises a flat portion 24B that forms the lateral side of the top portion and a raised portion 25B that is disposed medially to the flat portion 24B. Similarly, a bottom portion of the central body 17 also comprises a flat portion 24C that forms the lateral side of the bottom portion and a raised portion 25C that is disposed medially to the flat portion 24C. All of the flat portions 24A, 24B, 24C can be referred to collectively as the "flat portions 24", and all of the raised portions 25A, 25B, 25C can be referred to collectively as the "raised portions 25". The raised portions 25 extend rearward 404 relative to the adjacent flat portions 24. That is, the flat portions 24 are formed on the front side 11 of the connector 2 and do not extend to the rear side of the connector 2. The rearward extension of the raised portions 25 relative to the flat portions 24 can be better discerned by viewing FIG. 3 in conjunction with FIG. 4, and it is noted that the raised portion 25 is also numbered in FIG. 1. Relative to the lateral directions 102, all of the flat portions 25 on the left side of the connector 2 align with one another, and all of the flat portions 25 on the right side of the connector 2 align with one another ("left" and "right" being relative to the view shown in FIG. 4).

For each lock arm 18, the latching tab 5 has a bottom surface 27 that is adjacent to and extends laterally from a lateral side 28 of the lock arm 18, the lateral side 28 of the lock arm 18 being disposed opposite the medial side 19. The bottom surface 27 of each latching tab 5 is planar, and as labeled in the enlargement inset I in FIG. 4, the angle formed by the space between the bottom surface 27 of each latching tab 5 and the lateral side 28 of each lock arm 18 is 90 degrees. As shown in FIGS. 2A and 2B, a bottom surface 69, 69' of each tab receiving opening 4 is also planar (one bottom surface 69, 69' of one tab receiving opening 4 is numbered in each of FIGS. 2A and 2B).

FIG. 2A shows a bottom surface 69 that is offset from the rear platform wall 9 such that the bottom surface 69 is separated from the rear platform wall 9 by a section of the recessed channel wall 67, while FIG. 2B shows a bottom surface 69' that is adjacent to and extends rearward 404 from the rear platform wall 9. However, it should be noted that both bottom surfaces 69, 69' function in the same way to facilitate engagement between the latching tabs 5 and the tab receiving openings 4 when the connector 2 is installed in the housing 3 (detailed hereafter), and that the decision of whether to implement the bottom surface 69 or the bottom surface 69' is simply based on machining capabilities. Because the bottom surface 69 and the bottom surface 69' function in the same manner, only the reference number 69 is used hereinafter for the sake of simplicity, but it should be understood that the bottom surface 69' can be implemented instead of the bottom surface 69 without departing from the scope of the disclosed concept.

The bottom surface 69 of each tab receiving opening 4 and the recessed channel wall 67 of each sidewall 65 meet and form a 90 degree angle. Thus, when the connector 2 is installed in the housing 3 as shown in FIG. 1 and each latching tab 5 is engaged with its corresponding tab receiving opening 4, it is the planar bottom surface 27 of each latching tab 5 that engages the planar bottom surface 69 of the corresponding tab receiving opening 4, and it is the lateral side 28 of the corresponding lock arm 18 that engages the recessed channel wall 67 of the corresponding sidewall 65.

In order to install the connector 2 within the housing 3, the connector 2 is positioned so that its front side 11 faces the rear platform wall 9 of the housing 3, with the connector peak 52 positioned at a bottom edge 70 of the rear platform wall and pointed toward the housing peak 62. Then, the connector 2 is pushed in the upward direction 401 such that the front side 11 of the connector 2 slides against the rear platform wall 9 of the housing 3. Initially, as the connector 2 is pushed upward 401, the flat portions 24B on the top portion of the connector 2 are inserted into the channels 68 of the housing 3. While the channels 68 can be of a uniform width as shown in FIG. 2A, FIG. 2B shows an embodiment of the channels 68 that include a lead-in entry point 71 that can more easily guide the connector 2 into the housing 3. Each lead-in entry point 71 includes a laterally recessed lead-in portion 72 of the sidewall 65 and a rearward angled portion 73 of the sidewall 65. Each laterally recessed lead-in portion 72 is disposed adjacent to and below 402 the recessed channel wall 67 and extends somewhat laterally 102 relative to the recessed channel wall 67. Each rearward angled portion 73 is disposed adjacent to and below 402 the lip 66 and extends somewhat rearward 404 relative to the lip 66. As can be seen in FIG. 2B, the lead-in entry points 71 create a wider opening into the channels 68 that can make it easier to guide the flat portions 24B of the connector 2 for insertion into the channels 68 at the commencement of the installation process.

Once the flat portions 24B are entirely inserted into the channels 68, the sloped surface 22 of each lock arm 18 engages the recessed channel wall 67 of the corresponding sidewall 65. It should be noted that the sloped surfaces 22 are part of the flat portions 24A of the lock arms 18. When the lock arms 18 are in their default state as shown in FIG. 4, the bottom portion of each sloped surface 22 extends laterally past the recessed channel wall 67 of the corresponding sidewall 65. However, when the connector 2 is being pushed upward 401 into the housing 3 and the sloped surface 22 of each lock arm 18 engages the corresponding recessed channel wall 67, the engagement between the sloped surfaces 22 and the recessed channel walls 67 pushes each lock arm 18 medially toward the central body 17 of the connector 17, enabling the flat portions 24A to easily slide upward through the channels 68 as the connector 2 is pushed upward 401 into the housing 3. As the connector 2 is continually pushed upward, the flat portions 24C slide into the channels 68 after the flat portions 24A are entirely inserted into the channels 68. As shown in FIG. 3, the prong receiving slots 12 of the connector 2 extend from an interior of the central body 17 to the top side 51, which enables the prongs 8 of the housing 3 to be received by the prong receiving slots 12 as the connector 2 is pushed upward 401.

The height of the raised portions 25 of the connector 2 exceeds the height of the channels 68 (the height of each channel 68 being the distance between the rear platform wall 9 and the lip 66), which keeps the central body 17 of the connector 2 positioned between the channels 68 as the connector 2 is pushed upward 401. The connector continues to be pushed until the connector peak 52 engages the housing peak 62. The connector 2 and the housing 3 are proportioned such that, once the connector peak 52 engages the housing peak 62, the sloped surfaces 22 of the connector lock arms 18 are positioned upward 401 of the tab receiving openings 4 of the housing 3, and the latching tabs 5 are able to extend laterally 102 through the tab receiving openings 4. This is because, once the sloped surfaces 22 are positioned upward 401 of the tab receiving openings 4, the medial squeezing force is removed from each lock arm 18, enabling each latching tab 5 to extend through a medial side 4A to a lateral side 4B of the corresponding tab receiving opening 4 (the medial side 4A and lateral side 4B of one tab receiving opening 4 being visible in FIGS. 2A and 2B). Each tab receiving opening 4 forms a continuous opening from its medial side 4A to its lateral side 4B.

In order to perform the UL 20 pull test for the wire management arrangement 1, a grapple is placed around the conductors 6 at a location below the connector 2 (e.g. such as location 110, labeled in FIG. 1), and 20 lbf is attached to the grapple such that the force is applied downward 402 (relative to the view shown in FIG. 1). In order to pass the UL 20 pull test, the connector 2 must remain coupled to the housing 3. The wire management arrangement 1 fails the UL 20 pull test. The failure results from the engagement between those surfaces of the latching tab 5 that form a 90 degree angle and those surfaces of the tab receiving opening 4 that form a 90 degree angle, as the 20 lb force implemented during the pull test causes the lock arms 18 to be pulled medially toward the central body 17 of the connector 2 until the lateral edge 23 of each latching tab 5 is positioned medially relative to the recessed channel wall 67 of the corresponding rear sidewall 65. Once the lateral edges 23 of the latching tabs 5 are positioned medially relative to the recessed channel wall 67, the connector 2 is able to slide downward 402 relative to the housing 3, resulting in unintended removal of the connector 2 from the housing 3.

Figure 9A:
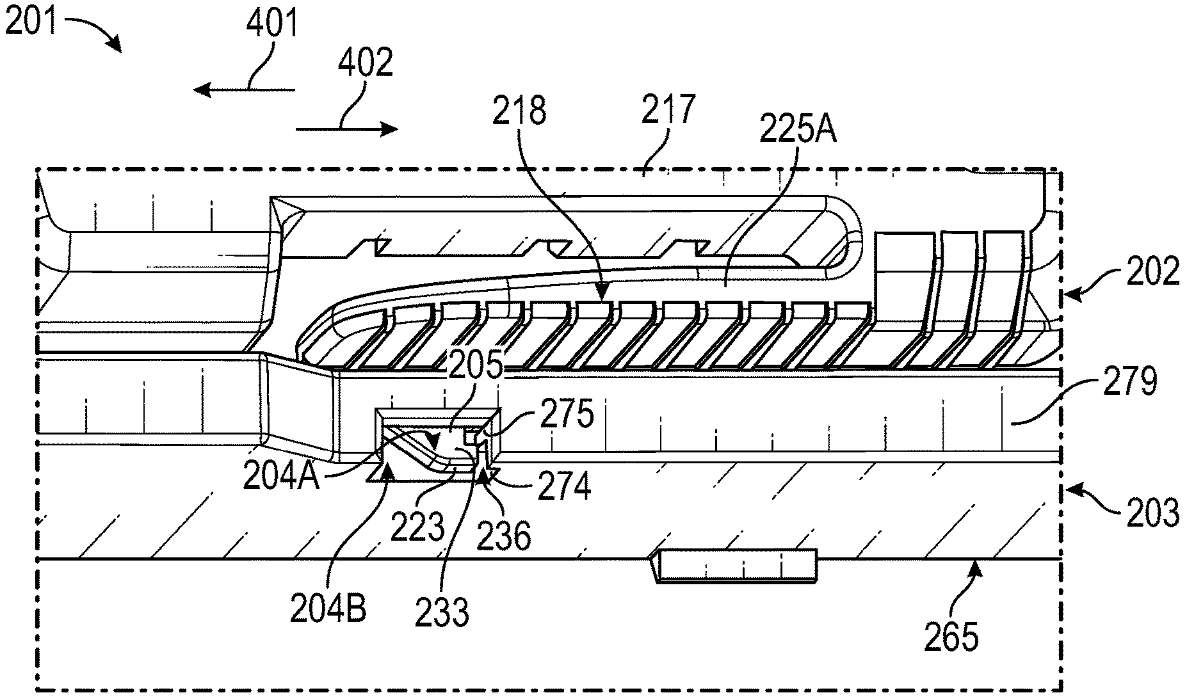
FIG. 9A is a rotated partial isometric view of a portion of an electrical wiring device wire management arrangement formed when the wire management connector shown in FIG. 6 includes the main compartment shown in FIG. 5 and is installed in the wire management housing shown in FIG. 7, showing the state of the lock arms of the wire management connector when no external force is applied to the wire management connector, in accordance with an example embodiment of the disclosed concept.
Figure 9B:
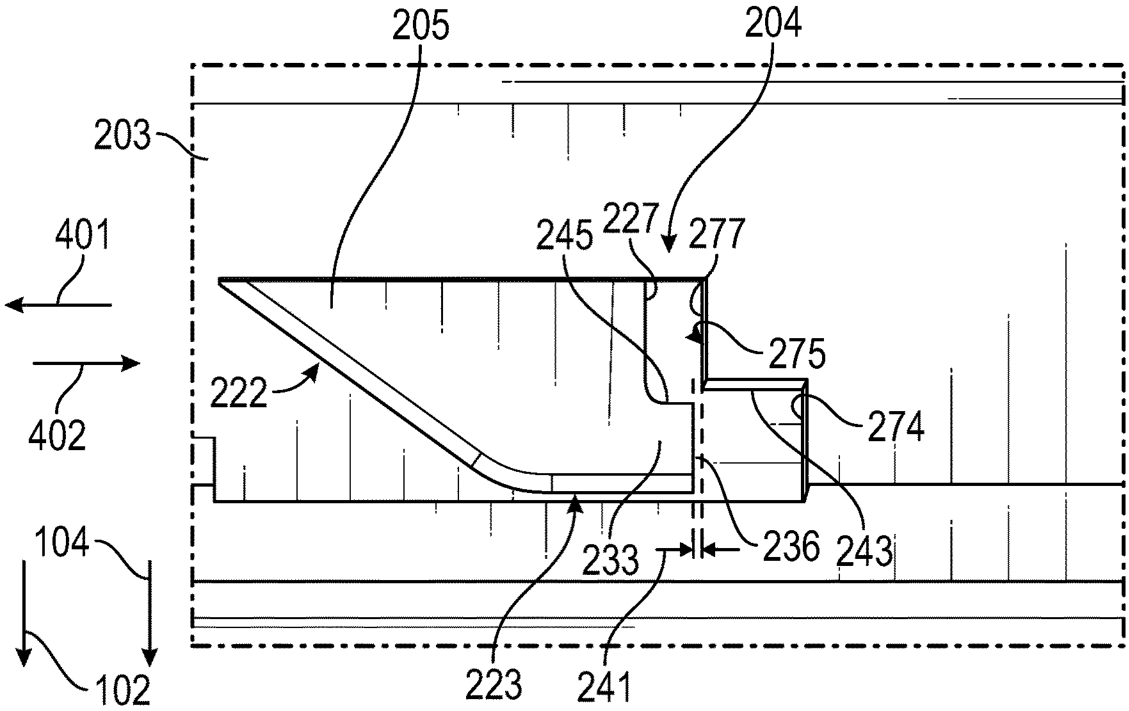
FIG. 9B is an enlarged view of a portion of FIG. 9A.
Figure 9C:
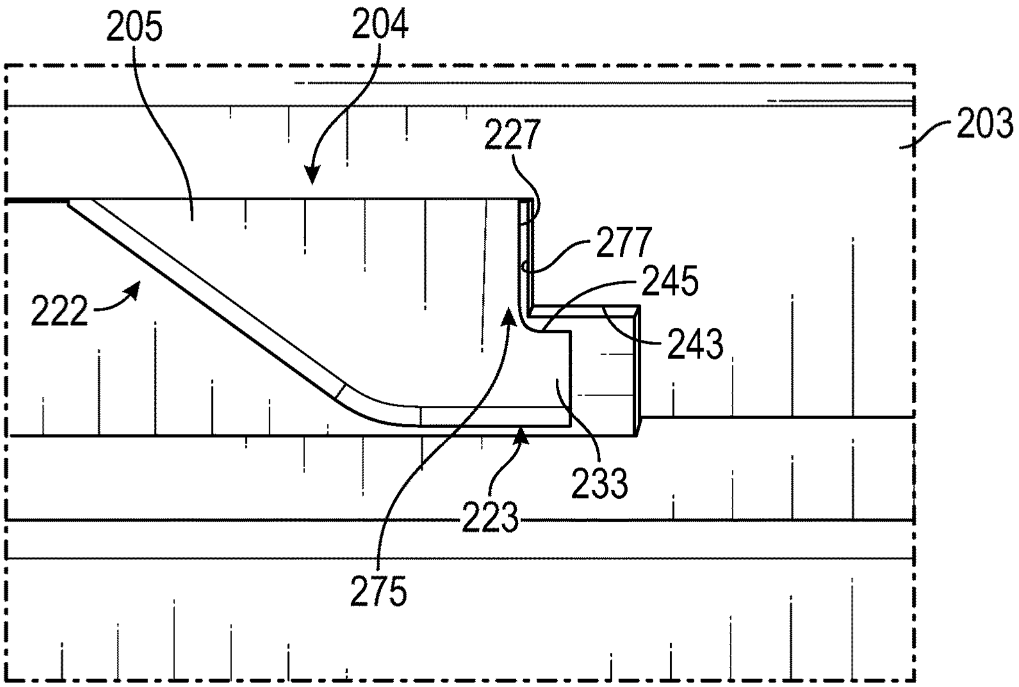
FIG. 9C shows the enlargement of FIG. 9B, after with the wire management connector has been moved into a locked position in the wire management housing, in accordance with an example embodiment of the disclosed concept.
Figure 10:
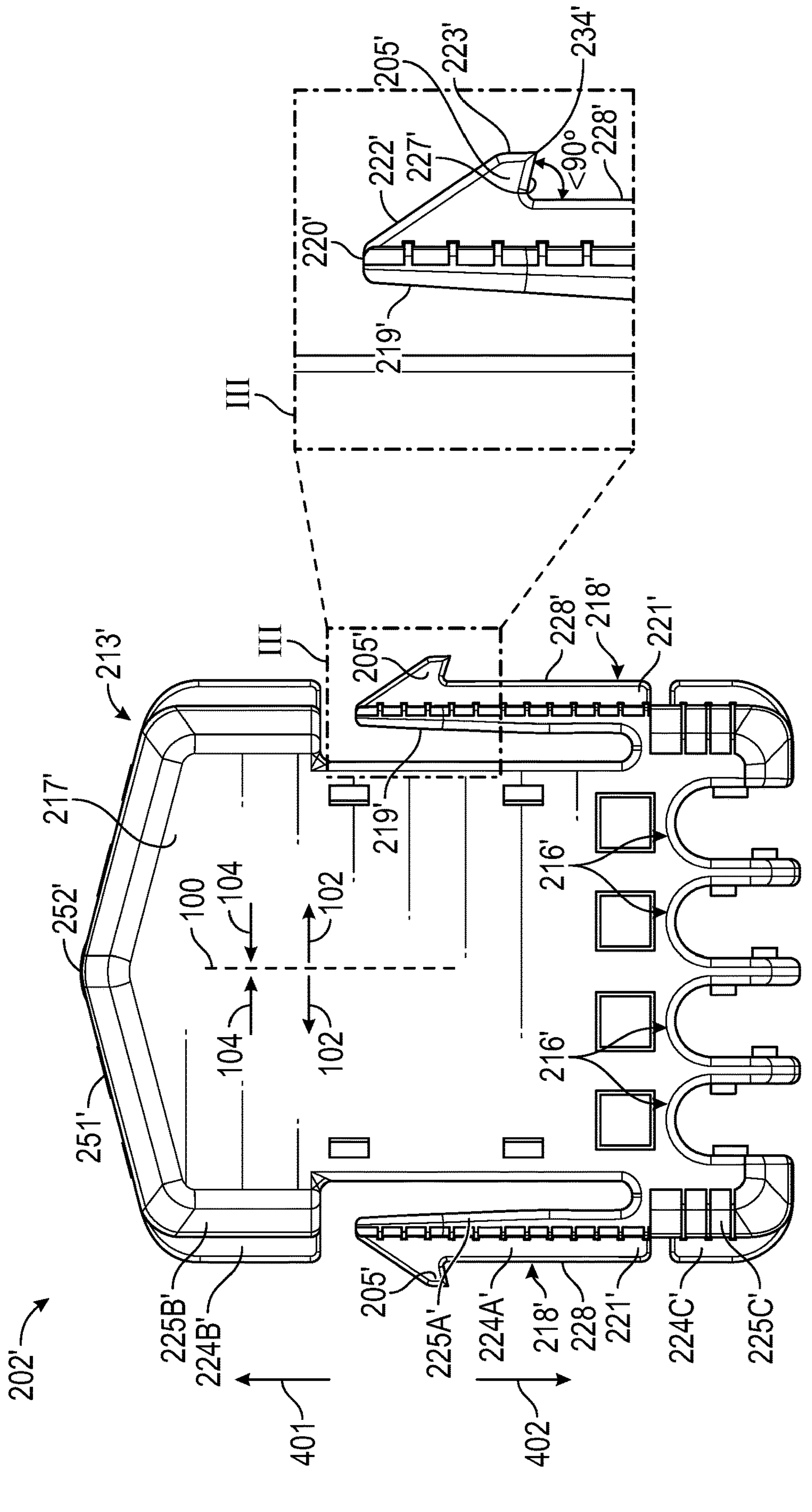
FIG. 10 is a rear elevation view of another embodiment of a main compartment for an improved third embodiment of a wire management connector, in accordance with another example embodiment of the disclosed concept.
Figure 11:
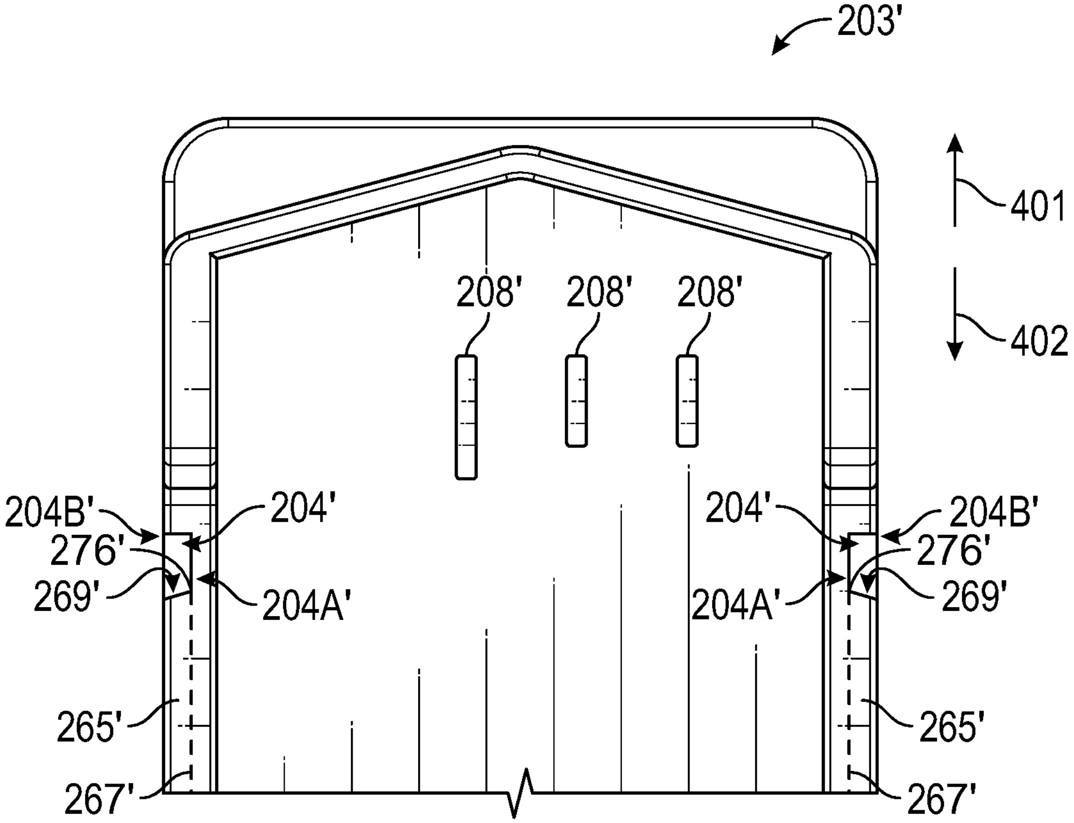
FIG. 11 is a rear elevation view of an improved third embodiment of a wire management housing for use with the main compartment and wire management connector shown in FIGS. 10 and 6, in accordance with another example embodiment of the disclosed concept.

As previously noted, FIGS. 5-11 show embodiments of wire management connectors and wire management housings that incorporate improvements to the connector 2 and housing 3. FIGS. 5-9C show the wire management connector 202 and wire management housing 203 of an improved wire management arrangement 201, and FIGS. 10-11 show the wire management connector 202' and wire management housing 203' of an improved wire management arrangement 201'. In particular, the wire management connectors 202, 202' include improved latching elements (latching hooks 205 and latching teeth 205') that correspond to the latching tabs 5, and the wire management housings 203, 203' include improved latch receiving openings (hook receiving openings 204 and tooth receiving openings 204') that correspond to the tab receiving openings 4. Otherwise, the improved wire management arrangements 201, 201' shown in FIGS. 5-11 include most of the same components as the wire management arrangement 1. Thus, the reference numbers used in FIGS. 1-4 to identify the features of the wire management arrangement 1 are incremented by 200 to number those features of the improved wire management arrangements 201, 201' shown in FIGS. 5-11 that are structurally and functionally equivalent to components of the wire management arrangement 1 (in the case of FIGS. 10-11, the reference numbers are also appended with a prime symbol, i.e. ' ' ').

For the sake of brevity, those components of the wire management arrangements 201, 201' that are structurally the same as corresponding components of the wire management arrangement 1 are not described again hereinafter and should be understood to function in the same manner as previously described herein in conjunction with FIGS. 1-4 for the corresponding components of the wire management arrangement 1. For example and without limitation, the process for installing the connector 202 within the housing 203 and the process for installing the connector 202' within the housing 203' is the same as the process for stalling the connector 2 within the housing 3, except that the improved features of the connectors 202, 202' and the housings 203, 203' result in the latching features of the connectors 202, 202' (corresponding to the latching tabs 5 of the connector 2) engaging with the tab receiving openings of the housing 203, 203' (corresponding to the tab receiving openings 4 of the housing 3) in an improved manner that enables the improved wire management arrangements 201, 201' to pass the UL 20 pull test.

Figure 5:
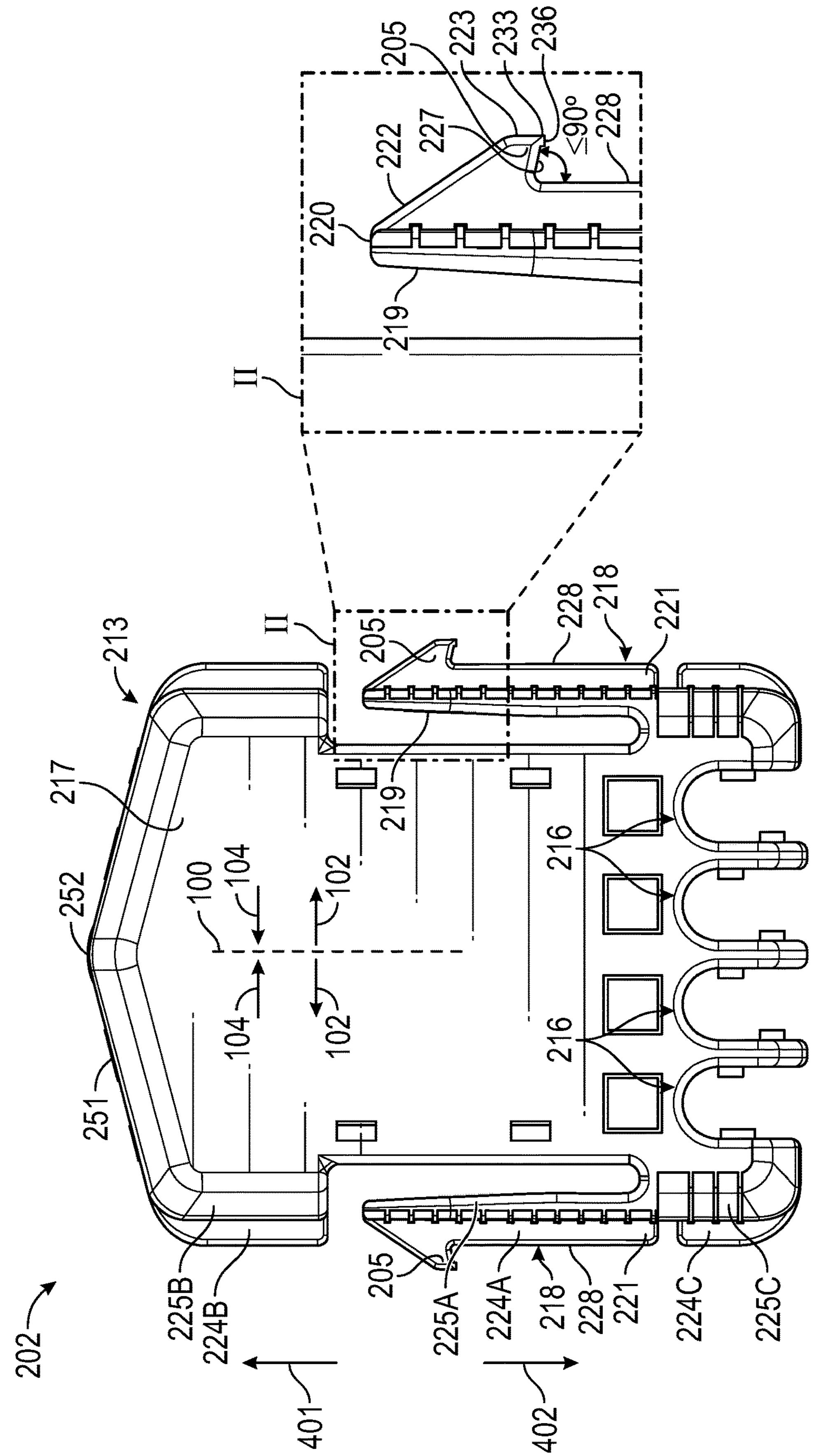
FIG. 5 is a rear elevation view of a main compartment for an improved second embodiment of a wire management connector, in accordance with an example embodiment of the disclosed concept.
Figure 6:
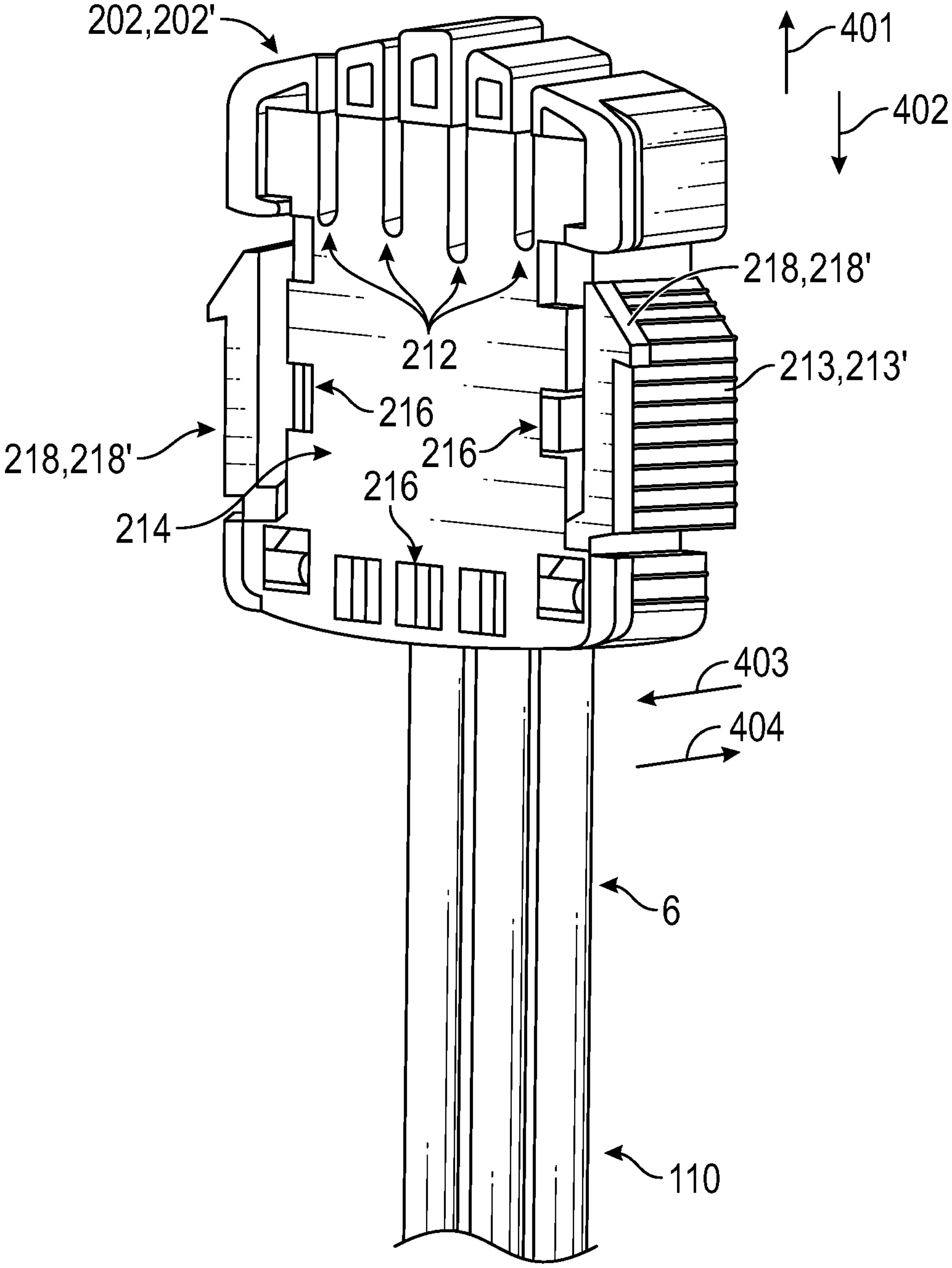
FIG. 6 is a partial isometric view of the front side of an improved wire management connector that can include the main compartment shown in FIG. 5 or the main compartment shown in FIG. 10, in accordance with example embodiments of the disclosed concept.

Reference is now made to FIGS. 5-9C, which show various components of an improved wiring management arrangement 201, in accordance with an example embodiment of the disclosed concept. FIG. 5 shows the rear side of an improved main compartment 213 for an improved wire management connector 202, and FIG. 6 shows the front side of the improved wire management connector 202 (comprising a removable front cover 214 coupled to the main compartment 213), in accordance with an example embodiment of the disclosed concept. It is noted that FIG. 6 includes some reference numbers using a prime symbol (i.e. "'") in order to refer to another embodiment 202' of the wire management connector 202 that uses a main compartment 213' (shown in FIG. 10) instead of the main compartment 213, as the scale of the components shown in FIG. 6 is too small to make the features that differentiate the embodiments 202 and 202' from one another apparent. The wire management connector 202' and its features are detailed later herein in connection with FIG. 10.

Figure 7:
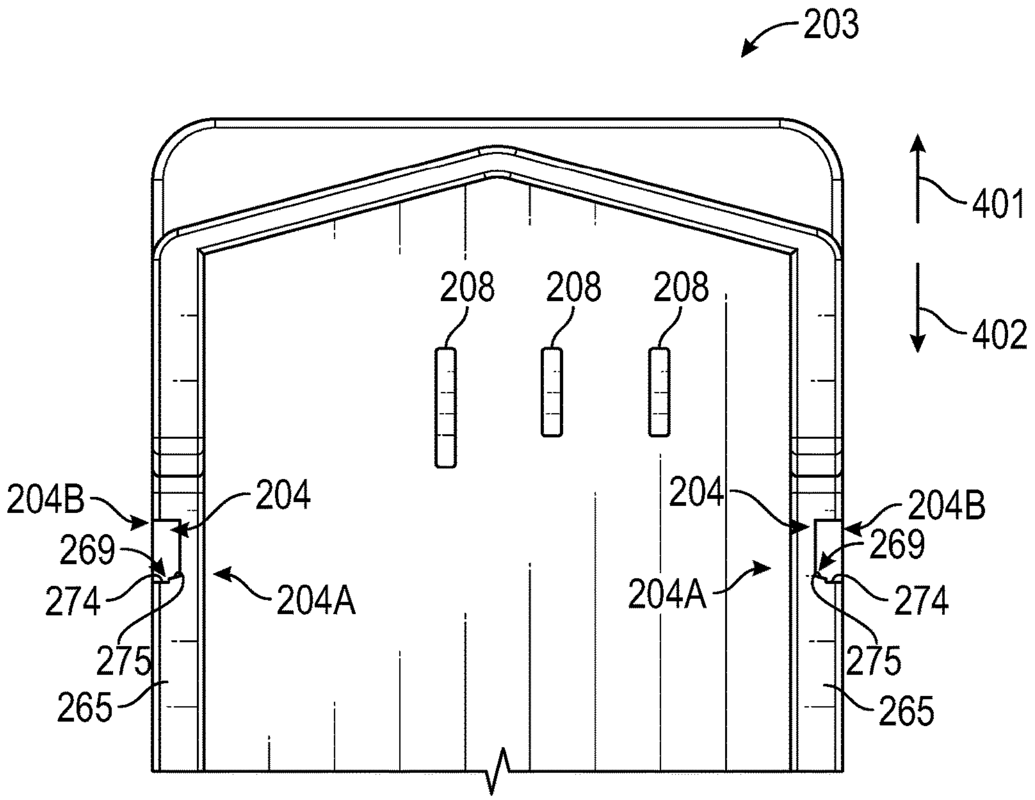
FIG. 7 is a rear elevation view of an improved second embodiment of a wire management housing for use with the main compartment and wire management connector shown in FIGS. 5 and 6, in accordance with an example embodiment of the disclosed concept.
Figure 8A:
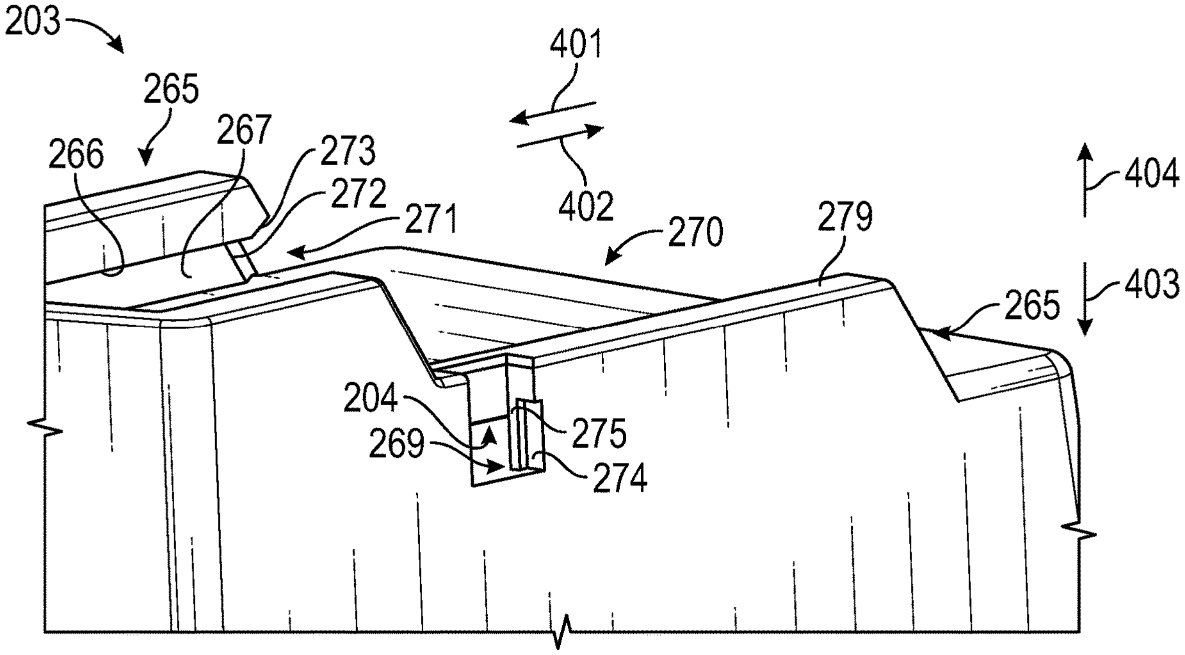
FIG. 8A is a rotated partial isometric view of a portion of the wire management housing shown in FIG. 7.

FIG. 7 shows the rear side of an improved wire management housing 203 structured to receive the wire management connector 202, and FIG. 8A shows a rotated partial isometric view of a portion of the improved wire management housing 203 shown in FIG. 7. The improved wire management housing 203 (FIGS. 7, 8A) can be installed in the improved wire management connector 202 to form an improved wire management arrangement 201. A portion of the fully assembled wire management arrangement 201 is shown in FIGS. 9A and 9B. For brevity, each of the wire management connectors 202, 202' detailed in connection with FIGS. 5-10 are referred to hereinafter as the "connector 202" or "connector 202'", and each of the wire management housings 203, 203' detailed in connection with FIGS. 5-10 are referred to hereinafter as the "housing 203" or "housing 203'".

Continuing to refer to FIG. 5, a latching hook 205 is formed at the top portion of each of the lock arms 218, with the latching hook 205 being the portion of each lock arm 218 that extends laterally beyond the lateral side 228 of the lock arm 218. At the apex 220 of each lock arm 218 (numbered in the enlargement inset II), the medial side 219 meets a sloped surface 222 that extends both downward and laterally from the apex 220 to meet a lateral edge 223 of the latching hook 205, with the lateral edge 223 extending downward from the sloped surface 222. A bottom surface 227 of the latching hook 205 extends laterally from the lateral side 228 of the lock arm 218 toward a hook overhang 233, the hook overhang 233 being a bottom portion of the latching hook 205 that is positioned laterally adjacent to the bottom surface 227 and that extends axially downward from the bottom surface 227. The hook overhang 233 comprises a bottom surface 236 that is adjacent to and meets the lateral edge 223. It should be noted that, in contrast with the latching tabs 5 of the connector 2 (FIG. 4), wherein the planar bottom surface 27 and the lateral edge 23 meet and are adjacent to one another, the bottom surface 227 and the lateral edge 223 of each of the latching hooks 205 (FIG. 5) are separated by the hook overhang 233.

As labeled in the enlargement inset II of FIG. 5 and as discussed further later herein, the angle formed between the bottom surface 227 of each latching hook 205 and the lateral side 228 of each lock arm 218 is 90 degrees or less. It is noted that the aforementioned angle and the exact shape of the hook overhang 233 vary slightly between FIG. 5 and FIGS. 9A-9C, such that the angle is depicted as a slightly acute angle in FIG. 5 while being depicted more closely to a right angle in FIGS. 9A-9C. These slight variations represent the variations that can result from the manufacturing process.

Referring to FIG. 7 and FIG. 8A, each of the hook receiving openings 204 of the housing 203 has a bottom surface 269 that corresponds to the bottom surface 227 and to the hook overhang 233 of the latching hooks 205 (FIG. 5). Unlike the bottom surfaces 69 of the tab receiving openings 4 of the early prototype housing 3 which are entirely planar, the bottom surface 269 of each hook receiving opening 204 comprises both a planar portion 274 and a protrusion 275 that extends upward 401 relative to the planar portion 274, with the planar portion 274 and the protrusion 275 meeting and being adjacent to one another. Each protrusion 275 is disposed medially relative to the adjacent planar portion 274.

Reference is now made to FIGS. 7, 8A, and 9A in conjunction with FIGS. 5 and 6. FIG. 7 shows the rear side of the housing 203, and FIG. 8A is used to better illustrate certain features of the hook receiving openings 204 of the housing 203. FIG. 9A shows a portion of the wire management arrangement 201 formed when the connector 202 is installed in the housing 203 as detailed hereafter. During the process of installing the connector 202 in the housing 203 by sliding the connector 202 upward 401 in the housing, once the sloped surfaces 222 of the connector lock arms 218 are disposed upward 401 of the hook receiving openings 204 (i.e. when the connector peak 252 engages the housing peak 262), the medial squeezing force is removed from each lock arm 218, enabling each latching hook 205 to extend through the medial side 204A to the lateral side 204B of the corresponding hook receiving opening 204 (the medial side 204A and lateral side 204B of the hook receiving openings 204 being numbered in FIG. 7 and FIG. 9A). The extension of each latching hook 205 through its corresponding hook receiving opening 204 (as shown in FIG. 9A) completes the installation of the connector 202 in the housing 203, and the state of the connector 202 as shown in FIG. 9A is the installed state. In one non-limiting example embodiment, the extension of each latching hook 205 through its corresponding hook receiving opening 204 will produce a click-type sound, by which a user will know that the connector 202 is successfully installed in the housing 203.

In order to facilitate easy installation of the connector 202 in the housing 203, the hook receiving openings 204 and latching hooks 205 are proportioned to provide a clearance 241 (see FIG. 9B) between the bottom surface 236 of each hook overhang 233 and a top surface 277 (see FIG. 9B) of the protrusion 275 of each hook receiving opening 204, the clearance 241 being a gap in the axial dimension between each bottom surface 236 and each top surface 277. Providing the clearances 241 ensures that each hook overhang 233 can freely move in the lateral direction 102 through its corresponding hook receiving opening 204 once the medial squeezing force is removed from each lock arm 218.

Figure 8B:
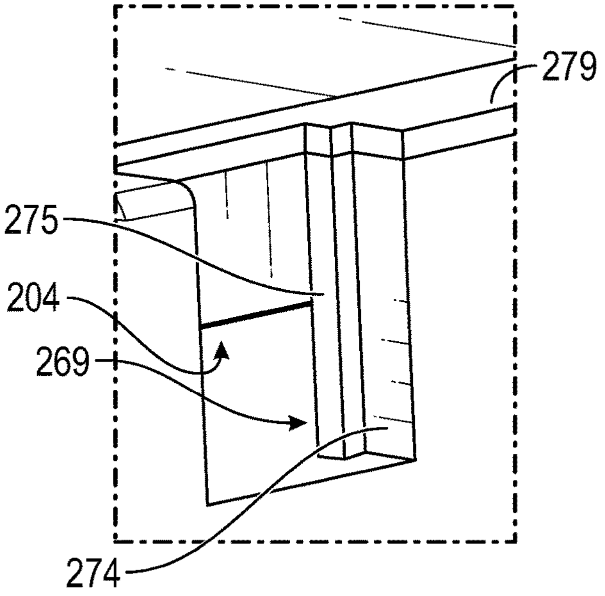
FIG. 8B is an enlarged view of a portion of the wire management housing shown in FIG. 8A, showing an alternative way to machine the hook receiving openings of the wire management housing.

FIG. 8B shows an embodiment of the housing 203 wherein the planar portion 274 of the bottom surface 269 of each hook receiving opening 204 extends all the way to a rear surface 237 of the sidewall 265, as opposed to the embodiment shown in FIG. 8A, wherein the planar portion 274 of the bottom surface 269 does not extend to the rear surface 237 of the sidewall 265. It is noted that the embodiment shown in FIG. 8A may be difficult to machine, while the embodiment shown in FIG. 8B is more easily machined. It is further noted that the extension of the planar portion 274 to the rear surface 237 of the sidewall 265 as shown in FIG. 8B does not affect the successful performance of the connector 202 during a UL 20 pull test.

The improved electrical wiring device wire management arrangement 201 successfully passes the UL 20 pull test, i.e. the connector 202 remains coupled to the housing 203 during the test. This success is due to the features of the latching hooks 205 that differentiate the latching hooks 205 from the latching tabs 5, as well as to the corresponding features of the hook receiving openings 204 that differentiate the hook receiving openings 204 from the tab receiving openings 4. These features of the latching hooks 205 and hook receiving openings 204 can be seen in FIG. 9B, which is an enlarged view of the disposition of the latching hook 205 relative to the hook receiving opening 204 of the housing 203 in the installed state shown in FIG. 9A.

In order to perform the UL 20 pull test for the connector 202, when the connector 202 is coupled to the housing 203, a grapple is placed around the conductors 6 at a location below the connector 202 (e.g. such as location 110, labeled in FIG. 6), and 20 lbf is attached to the grapple such that the force is applied downward (relative to the view shown in FIG. 6). When the UL 20 test is performed, the connector 202 is moved from the installed position (shown in FIG. 9B) into a locked position (shown in FIG. 9C) due to the exertion of a downward 402 force on the connector 202 by the 20 lbf attached to the grapple. In the locked position shown in FIG. 9C, the protrusion 275 of the hook receiving opening 204 obstructs the hook overhang 233 of the latching hook 205 from moving medially out of the locked position. Thus, the engagement between the protrusion 275 of the hook receiving opening 204 and the hook overhang 233 prevents the latching hook 205 from becoming de-installed during a UL 20 pull test. It is noted that the connector 202 is produced from a material that is somewhat pliable in an example embodiment, and that the downward 402 force exerted by the 20 lb test weight on the conductors 6 may cause slight movement of the hook overhang 233 in the medial direction 104 toward a lateral edge 243 of the protrusion 275 of the corresponding hook receiving opening 204. However, once a medial edge 245 of the hook overhang 233 engages the lateral edge 243 of the hook protrusion 275, the latch hook 205 is prevented from moving any further in the medial direction 104.

As shown in the enlargement inset II in FIG. 5, for each lock arm 218, the bottom surface 227 of the latching hook 205 extends generally laterally from the lateral side 228 of the lock arm 218 to the hook overhang 233. As previously stated and labeled in the enlargement inset II, the angle formed by the space between the bottom surface 227 of each latching hook 205 and the lateral side 228 of each lock arm 218 is 90 degrees or less. It is noted that the angle between a top surface 277 (numbered only in FIG. 9B) of the opening protrusion 275 and the lateral edge 243 of the hook protrusion 275 corresponds to the angle formed by the space between the bottom surface 227 of each latching hook 205 and the lateral side 228 of each lock arm 218. Due to the small size of both the latching hook 205 and the hook receiving opening 204, manufacturing process limitations may necessitate that the housing 203 be produced such that the angle between the top surface 277 of each protrusion 275 and the lateral edge 243 of the hook protrusion 275 be slightly different than the angle formed by the space between the bottom surface 227 of each latching hook 205 and the lateral side 228 of each lock arm 218; however, it is noted that the former angle does not exceed the latter angle. The connector 202 and housing 203 pass the UL 20 pull test both when the angle formed by the space between the bottom surface 227 of each latching hook 205 and the lateral side 228 of each lock arm 218 is 90 degrees and when the angle is less than 90 degrees.

The wire management arrangement 201 successfully passes the UL 20 pull test, because the connector 202 and housing 203 are advantageously designed to ensure that the connector 202 cannot be inadvertently de-installed from the housing 203 when a downward 402 force (such as that applied during the UL 20 pull test) is applied to the connector 202 while the connector 202 is installed in the housing 203. As detailed above, the connector 202 and housing 203 are structured such that exertion of a downward 402 force on the connector 202 when it the connector is installed in the housing 203 will cause the connector 202 to move downward 402 from the installed position into the locked position. This is due to each latching hook 205 and the opening protrusion 275 of each corresponding hook receiving opening 204 being proportioned such that, when no medial force is acting upon the lock arms 218, the medial edge 245 (FIGS. 9B-9C) of the hook overhang 233 extends laterally beyond the lateral edge 243 of the protrusion 275 of the corresponding hook receiving opening 204. Accordingly, when a downward 402 force is exerted upon an installed connector 202, the bottom surface 236 of the hook overhang 233 is able to move toward the planar portion 274 of the hook receiving opening 204 without being obstructed by the opening protrusion 275.

Referring now to FIG. 10 and FIG. 11, FIG. 9 shows the rear side of another embodiment 213' of the main compartment 213 shown in FIG. 5, in accordance with another exemplary embodiment of the disclosed concept, while FIG. 10 shows the rear side of another embodiment 203' of the improved housing 203 shown in FIG. 7, in accordance with another exemplary embodiment of the disclosed concept. The sole difference between the main compartment 213' and the main compartment 213 is the latching element included. Specifically, each of the lock arms 218' of the main compartment 213' includes a latching tooth 205' instead of the latching hook 205 included in the lock arms 218 of the main compartment 213. The sole difference between the housing 203' and the housing 203 is the latch receiving opening formed in the sidewalls. Specifically, each of the sidewalls 265' of the housing 203' includes a tooth receiving opening 204' structured to receive the latching tooth 205' instead of including the hook receiving opening 204 included in the sidewalls 265 of the housing 203.

Accordingly, it is to be understood that the front cover 214 shown in FIG. 6 can be removably coupled to the main compartment 213' in the same manner that the front cover 214 is removably coupled to the main compartment 213, and that coupling the front cover 214 to the main compartment 213' forms another embodiment 202' of the connector 202 (as indicated in FIG. 6). It should also be understood that the connector 202' is structured to be installed in the housing 203' in order to form another embodiment 201' of the wire management arrangement 201. For the sake of brevity, only those features of the lock arms 218' and the sidewalls 265' that differ from the respective lock arms 218 and sidewalls 265 will be detailed hereafter, and it should be understood that all other features of the connector 202' (including those of the main compartment 213') and of the housing 203' are the same as those of the respective connector 202 and housing 203.

Referring now to both FIG. 10 and FIG. 11, it is noted that the connector 202' is structured to be installed in the housing 203' (FIG. 11) in a manner similar to that in which the connector 202 is installed in the housing 203. During the process of installing the connector 202' in the housing 203' by sliding the connector 202' upward 401 in the housing 203', once the sloped surfaces 222' of the connector lock arms 218' are disposed upward 401 of the tooth receiving openings 204' (i.e. once the connector peak 252' engages the housing peak 262'), the medial squeezing force is removed from each lock arm 218', enabling each latching tooth 205' to extend through the medial side 204A' to the lateral side 204B' of the corresponding tooth receiving opening 204' (the medial side 204A' and lateral side 204B' of the tooth receiving openings 204' being numbered in FIG. 11). The connector 202' and the housing 203' are both proportioned to ensure that there is clearance between a tooth point 234' of each latching tooth 205' and a peak 276' of the bottom surface 269' of each tooth receiving opening 204' during installation of the connector 202' in the housing 203', so that each tooth point 234' can freely move in the lateral direction 102 through its corresponding tooth receiving opening 204' without being obstructed by the peaks 275'.

The extension of each latching tooth 205' through its corresponding tooth receiving opening 204' completes the installation of the connector 202' in the housing 203' and signifies that the connector 202' is in the installed state. In one non-limiting example embodiment, the extension of each latching tooth 205' through its corresponding tooth receiving opening 204' will produce a click-type sound, by which a user will know that the connector 202' is successfully installed in the housing 203'. It should be noted that when the connector 202' is installed in the housing 203', there is a gap between the bottom surface 227' of each latching tooth 205' and the bottom surface 269' of each corresponding tooth receiving opening 204'.

As shown in the enlargement inset III in FIG. 10, a bottom surface 227' of the latching tooth 205' extends laterally from the lateral side 228' of the lock arm 218' toward the lateral edge 223' and meets the lateral edge 223'. The point formed by the meeting of the bottom surface 227' and the lateral edge 223' is the tooth point 234'. As labeled in the enlargement inset III, the angle formed by the space between the bottom surface 227' of each latching tooth 205' and the lateral side 228' of each lock arm 218' is acute, i.e. less than 90 degrees. In an exemplary embodiment of the main compartment 213', the angle between the bottom surface 227' of each latching tooth 205' and the lateral side 228' of each lock arm 218' is no greater than 30 degrees and is ideally between 10 degrees and 30 degrees.

Referring now to FIG. 11, it is noted that a recessed channel wall 267' of each sidewall 265' is shown in broken line, as the recessed channel walls 267' are hidden by the rear surfaces 237' of the sidewalls 265' in the elevation view of FIG. 11. The recessed channel walls 267' correspond to the recessed channel wall 267 of the housing 203 visible in FIG. 8A. The bottom surface 269' of each tooth receiving opening 204' and the recessed channel wall 267' of each sidewall 265' meet and form an angle corresponding to (i.e. equal to or nearly equal to) the angle between the bottom surface 227' of each latching tooth 205' and the lateral side 228' of each lock arm 218'.

The improved wire management arrangement 201' successfully passes the UL 20 pull test, i.e. the connector 202' remains coupled to the housing 203' during the test. This success is due to the features of the latching teeth 205' that differentiate the latching teeth 205' from the latching tabs 5, as well as to the corresponding features of the tooth receiving openings 204' that differentiate the tooth receiving openings 204' from the tab receiving openings 4. To perform the UL 20 pull test on the wire management arrangement 201', a grapple is placed around the conductors 6 at a location below the connector 202' (e.g. such as location 110, labeled in FIG. 6), and 20 lbf is attached to the grapple such that the force is applied downward (relative to the view shown in FIG. 6).

When the connector 202' is installed in the housing 203' and the UL 20 pull test is performed, the connector 202' and the housing 203' are proportioned such that the downward 402 force exerted on the conductors 6 will cause the connector 202' to move downward 402 into a locked position in which the bottom surface 227' of each latching tooth 205' engages the bottom surface 269' of the corresponding tooth receiving opening 204'. Once the connector 202' is in the locked position, the bottom surface 269' of each tooth receiving opening 204' exerts force in the lateral direction 102 in response to any movement of the corresponding latching tooth 205' in the medial direction 104, due to the aforementioned acute angle between the bottom surface 227' of each latching tooth 205' and the lateral side 228' of each lock arm 218' and the corresponding acute angle between the bottom surface 269' of each tooth receiving opening 204' and the recessed channel wall 267' of each sidewall 265'. Thus, the engagement between the bottom surface 269' of each tooth receiving opening 204' and the bottom surface 227' of each latching tooth 205' prevents the latching tooth 205' from becoming de-installed during a UL 20 pull test.

Although the wire management arrangements 201 and 201' are designed to bias the respective connectors 202 and 202' from the installed position into the locked position and prevent unintended de-installation when downward 402 force is exerted on the connector 202 or 202', the wire management arrangements 201 and 201' are also designed to facilitate easy removal of the connector 202 or 202' when removal is intended. Even when one of the connectors 202, 202' is in the locked position, a user can remove the connector 202, 202' from the housing 203, 203' relatively easily, as the user simply needs to exert medial force on the raised portions 225A, 225A' of the lock arms 218, 218' using finger pressure (e.g. by squeezing the raised portions 225A, 225A' medially) to enable the latching elements 205, 205' to overcome the obstructions to medial movement posed by the protrusions 275 and the bottom surfaces 269', and then slide the connector 202, 202' downward 402 out of the housing 203, 203'.

Finger pressure is sufficient to overcome the obstructions of the protrusions 275 and the bottom surfaces 269' because the lateral edges 243 of the protrusions 275 of the hook receiving openings 204 (see FIG. 9B) and the bottom surfaces 269' of the tooth receiving openings 204' (see FIG. 11) are of relatively short height in the axial dimension (i.e. the upward 401 to downward 402 dimension). Intentional exertion of medial 104 force on the raised portions 225A, 225A' of the lock arms 218, 218' enables the latching hooks/teeth 205, 205' to move medially past the recessed channel walls 267, 267' of the housing 203, 203' so that the connector 204, 204' can be slid downward 402 in order to remove the connector 202, 202' from the housing 203, 203'. Of course, when either connector 202, 202' is in the installed position in the housing 203, 203' and not locked, a user can remove the connector 202, 202' from the housing 203, 203' in the same manner (i.e. by using finger pressure to exert medial force on the raised portions 225A, 225A' until the latching hooks/teeth 205, 205' move medially past the recessed channel walls 267, 267' and then sliding the connector 202, 202' downward 402 out of the housing 203, 203').

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A wire management arrangement for managing a plurality of conductors connected between an electrical wiring device and an electrical grid, the wire management arrangement comprising:
 a connector, the connector comprising:
  a central body structured to receive the plurality of conductors;
  a plurality of prong receiving slots, the prong receiving slots being configured to electrically connect to the conductors; and
  two lock arms, each lock arm including:
   a base connected to the central body:
   a remainder portion that extends from the base;
   a medial side that faces the central body;
   a lateral side disposed opposite the medial side; and
   a latching element, the latching element having a bottom surface that extends laterally from the lateral side; and
 a housing, the housing comprising:
  two latch receiving openings, with each latch receiving opening corresponding to one of the latching elements and comprising:
   a medial end and a lateral end such that the latch receiving opening extends from the medial end to the lateral end; and
   a bottom surface structured to engage the bottom surface of the latching element; and
  a plurality of conductive prongs, each conductive prong being structured to be received by one of the prong receiving slots of the connector,
 wherein the medial side of each lock arm faces the central body and is separated from the central body by a gap when the lock arm is in a default state,
 wherein each lock arm is structured such that, if a medial force is exerted upon the lock arm, the lock arm moves closer toward the central body of the connector and the gap between the lock arm and the central body of the connector decreases,
 wherein each lock arm has memory such that, after the medial force is removed from the lock arm, the lock arm returns to its default state,
  wherein each latching element is structured to extend through its corresponding latch receiving opening from the medial end to the lateral end in order to couple the connector to the housing, and
  wherein each latch receiving opening is structured to exert lateral resistance against the corresponding latching element in response to exertion of a downward force on the connector.

2. The wire management arrangement of claim 1,
 wherein the connector can be coupled to the housing either in an installed position or in a locked position, and
 wherein, for each latch receiving opening and the corresponding latching element:
  in the installed position, the bottom surface of the latch receiving opening does not engage the bottom surface of the corresponding latching element, and
  in the locked position, the bottom surface of the latch receiving opening engages the bottom surface of the corresponding latching element.

3. The wire management arrangement of claim 2,
 wherein the latch receiving openings are structured such that, when the connector is in the installed position, exertion of the downward force on the plurality of conductors causes the connector to move into the locked position.

4. The wire management arrangement of claim 2,
 wherein the latch receiving openings and latching elements are structured such that, when the connector is coupled to the housing in either the installed position or the locked position, the connector can only be deinstalled from the wire management housing if medial force is exerted on the latching elements.

5. The wire management arrangement of claim 1,
 wherein, for each lock arm, an angle formed between the lateral side of the lock arm and the bottom surface of the latching element is less than 90 degrees.

6. The wire management arrangement of claim 5,
 wherein, for each lock arm:
  the latching element comprises a hook overhang positioned laterally adjacent to the bottom surface of the latching element, and
  the hook overhang extends axially downward relative to the bottom surface of the latching element,
 wherein, for each latch receiving opening:
  the bottom surface comprises a planar surface adjacent to the lateral end of the latch receiving opening and a protrusion adjacent to the medial end of the latch receiving opening, and
  the protrusion is medially adjacent to the planar surface,
 wherein the connector is structured to be installed in the housing in a locked position in which the bottom surface of each latching element engages the protrusion of the corresponding latch receiving opening, and
 wherein, when the connector is installed in the housing in the locked position, the protrusion of each latch receiving opening obstructs the corresponding hook overhang from moving in the medial direction.

7. The wire management arrangement of claim 5,
 wherein the housing includes two sidewalls, and wherein each latch receiving opening is formed in one of the sidewalls,
 wherein each sidewall comprises a recessed channel wall,
 wherein, for each sidewall:
  the bottom surface of the latch receiving opening is adjacent to the recessed channel wall, and
  an angle formed between the bottom surface of the latch receiving opening and the recessed channel wall corresponds to the angle formed between the lateral side of each lock arm and the bottom surface of each latching element,
 wherein the connector is structured to be installed in the housing in a locked position in which the bottom surface of each latching element engages the bottom surface of the corresponding latch receiving opening, and
 wherein, when the connector is installed in the housing in the locked position, the bottom surface of each latch receiving opening obstructs the bottom surface of the corresponding latching element from moving in the medial direction.

8. The wire management arrangement of claim 1,
 wherein, for each lock arm:
  an angle formed between the lateral side of the lock arm and the bottom surface of the latching element is 90 degrees, the latching element comprises a hook overhang positioned laterally adjacent to the bottom surface of the latching element, and the hook overhang extends axially downward relative to the bottom surface of the latching element, wherein, for each latch receiving opening:

the bottom surface comprises a planar surface adjacent to the lateral end of the latch receiving opening and a protrusion adjacent to the medial end of the latch receiving opening, and the protrusion is medially adjacent to the planar surface, wherein the connector is structured to be installed in the housing in a locked position in which the bottom surface of each latching element engages the protrusion of the corresponding latch receiving opening, and wherein, when the connector is installed in the housing in the locked position, the protrusion of each latch receiving opening obstructs the corresponding hook overhang from moving in the medial direction.

9. A wire management arrangement for managing a plurality of conductors connected between an electrical wiring device and an electrical grid, the wire management arrangement comprising:

a connector, the connector comprising:

a central body structured to receive the plurality of conductors;

a plurality of prong receiving slots, the prong receiving slots being configured to electrically connect to the conductors; and two lock arms, each lock arm including:

a medial side that faces the central body;

a lateral side disposed opposite the medial side; and a latching element, the latching element having a bottom surface that extends laterally from the lateral side; and a housing, the housing comprising:

two latch receiving openings, with each latch receiving opening corresponding to one of the latching elements and comprising:

a medial end and a lateral end such that the latch receiving opening extends from the medial end to the lateral end; and a bottom surface structured to engage the bottom surface of the latching element;

a plurality of conductive prongs, each conductive prong being structured to be received by one of the prong receiving slots of the connector;

a rear platform wall from which the plurality of conductive prongs extend; and two sidewalls, with each latch receiving opening being formed in one of the sidewalls, wherein each sidewall comprises a recessed channel wall, and wherein, for each sidewall, the bottom surface of the latch receiving opening is separated from the rear platform wall by a section of the recessed channel wall, wherein each latching element is structured to extend through its corresponding latch receiving opening from the medial end to the lateral end in order to couple the connector to the housing, and wherein each latch receiving opening is structured to exert lateral resistance against the corresponding latching element in response to exertion of a downward force on the connector.

10. The wire management arrangement of claim 9, wherein the latch receiving openings and latching elements are structured such that, when the connector is coupled to the housing, the connector can only be de-installed from the wire management housing if medial force is exerted on the latching elements.

11. The wire management arrangement of claim 9, wherein, for each lock arm, an angle formed between the lateral side of the lock arm and the bottom surface of the latching element is less than 90 degrees.

12. The wire management arrangement of claim 11, wherein, for each lock arm:

the latching element comprises a hook overhang positioned laterally adjacent to the bottom surface of the latching element, and the hook overhang extends axially downward relative to the bottom surface of the latching element, wherein, for each latch receiving opening:

the bottom surface comprises a planar surface adjacent to the lateral end of the latch receiving opening and a protrusion adjacent to the medial end of the latch receiving opening, and the protrusion is medially adjacent to the planar surface, wherein the connector is structured to be installed in the housing in a locked position in which the bottom surface of each latching element engages the protrusion of the corresponding latch receiving opening, and wherein, when the connector is installed in the housing in the locked position, the protrusion of each latch receiving opening obstructs the corresponding hook overhang from moving in the medial direction.

13. The wire management arrangement of claim 9, wherein, for each lock arm:

an angle formed between the lateral side of the lock arm and the bottom surface of the latching element is 90 degrees, the latching element comprises a hook overhang positioned laterally adjacent to the bottom surface of the latching element, and the hook overhang extends axially downward relative to the bottom surface of the latching element, wherein, for each latch receiving opening:

the bottom surface comprises a planar surface adjacent to the lateral end of the latch receiving opening and a protrusion adjacent to the medial end of the latch receiving opening, and the protrusion is medially adjacent to the planar surface, wherein the connector is structured to be installed in the housing in a locked position in which the bottom surface of each latching element engages the protrusion of the corresponding latch receiving opening, and wherein, when the connector is installed in the housing in the locked position, the protrusion of each latch receiving opening obstructs the corresponding hook overhang from moving in the medial direction.

14. A wire management arrangement for managing a plurality of conductors connected between an electrical wiring device and an electrical grid, the wire management arrangement comprising;

a connector, the connector comprising:

a central body structured to receive the plurality of conductors;

a plurality of prone receiving slots, the prong receiving slots being configured to electrically connect to the conductors; and two lock arms, each lock arm including:
a medial side that faces the central body;
a lateral side disposed opposite the medial side; and
a latching element, the latching element having a bottom surface that extends laterally from the lateral side; and
a housing, the housing comprising:
two latch receiving openings, with each latch receiving opening corresponding to one of the latching elements and comprising:
a medial end and a lateral end such that the latch receiving opening extends from the medial end to the lateral end; and
a bottom surface structured to engage the bottom surface of the latching element;
a plurality of conductive prongs, each conductive prong being structured to be received by one of the prong receiving slots of the connector;
a rear platform wall from which the plurality of conductive prongs extends; and
two sidewalls, with each latch receiving opening being formed in one of the sidewalls,
wherein each sidewall comprises a recessed channel wall, and
wherein, for each sidewall, the bottom surface of the latch receiving opening is adjacent to and extends rearward from the rear platform wall,
wherein each latching element is structured to extend through its corresponding latch receiving opening from the medial end to the lateral end in order to couple the connector to the housing, and
wherein each latch receiving opening is structured to exert lateral resistance against the corresponding latching element in response to exertion of a downward force on the connector.

15. The wire management arrangement of claim 14, wherein the latch receiving openings and latching elements are structured such that, when the connector is coupled to the housing, the connector can only be de-installed from the wire management housing if medial force is exerted on the latching elements.

16. The wire management arrangement of claim 14, wherein, for each lock arm, an angle formed between the lateral side of the lock arm and the bottom surface of the latching element is less than 90 degrees.

17. The wire management arrangement of claim 16, wherein, for each lock arm:
the latching element comprises a hook overhang positioned laterally adjacent to the bottom surface of the latching element, and
the hook overhang extends axially downward relative to the bottom surface of the latching element,
wherein, for each latch receiving opening:
the bottom surface comprises a planar surface adjacent to the lateral end of the latch receiving opening and a protrusion adjacent to the medial end of the latch receiving opening, and
the protrusion is medially adjacent to the planar surface,
wherein the connector is structured to be installed in the housing in a locked position in which the bottom surface of each latching element engages the protrusion of the corresponding latch receiving opening, and
wherein, when the connector is installed in the housing in the locked position, the protrusion of each latch receiving opening obstructs the corresponding hook overhang from moving in the medial direction.

18. The wire management arrangement of claim 14, wherein, for each lock arm:
an angle formed between the lateral side of the lock arm and the bottom surface of the latching element is 90 degrees,
the latching element comprises a hook overhang positioned laterally adjacent to the bottom surface of the latching element, and
the hook overhang extends axially downward relative to the bottom surface of the latching element,
wherein, for each latch receiving opening:
the bottom surface comprises a planar surface adjacent to the lateral end of the latch receiving opening and a protrusion adjacent to the medial end of the latch receiving opening, and
the protrusion is medially adjacent to the planar surface,
wherein the connector is structured to be installed in the housing in a locked position in which the bottom surface of each latching element engages the protrusion of the corresponding latch receiving opening, and
wherein, when the connector is installed in the housing in the locked position, the protrusion of each latch receiving opening obstructs the corresponding hook overhang from moving in the medial direction.

19. A wire management arrangement for managing a plurality of conductors connected between an electrical wiring device and an electrical grid, the wire management arrangement comprising:
a connector, the connector comprising:
a central body structured to receive the plurality of conductors;
a plurality of prong receiving slots, the prong receiving slots being configured to electrically connect to the conductors; and
two lock arms, each lock arm including:
a medial side that faces the central body;
a lateral side disposed opposite the medial side; and
a latching element, the latching element having a bottom surface that extends laterally from the lateral side; and
a housing, the housing comprising:
two latch receiving openings, with each latch receiving opening corresponding to one of the latching elements and comprising:
a medial end and a lateral end such that the latch receiving opening extends from the medial end to the lateral end; and
a bottom surface structured to engage the bottom surface of the latching element;
a plurality of conductive prongs, each conductive prong being structured to be received by one of the prong receiving slots of the connector; and
two sidewalls, with each latch receiving opening being formed in one of the sidewalls,
wherein, for each sidewall:
the sidewall comprises a recessed channel wall and a lip extending medially from the recessed channel wall,
the sidewall comprises a laterally recessed lead-in portion and a rearward angled portion,
the laterally recessed lead-in portion is disposed adjacent to and below the recessed channel wall and extends laterally relative to the recessed channel wall, and
the rearward angled portion is disposed adjacent to and below the lip and extends rearward relative to the lip, wherein each latching element is structured to extend through its corresponding latch receiving opening from the medial end to the lateral end in order to couple the connector to the housing, and wherein each latch receiving opening is structured to exert lateral resistance against the corresponding latching element in response to exertion of a downward force on the connector.

20. The wire management arrangement of claim 19, wherein the latch receiving openings and latching elements are structured such that, when the connector is coupled to the housing, the connector can only be de-installed from the wire management housing if medial force is exerted on the latching elements.

* * * * *